INVENTORS
JOHN HAYS HAMMOND, JR.
EMORY LEON CHAFFEE
BY [signature]
ATTORNEY

April 5, 1960 J. H. HAMMOND, JR., ET AL 2,931,857

TELEVISION RECONNAISSANCE SYSTEM

Filed Sept. 23, 1955 6 Sheets-Sheet 2

INVENTORS
JOHN HAYS HAMMOND, JR.
EMORY LEON CHAFFEE
BY
ATTORNEY

INVENTORS
JOHN HAYS HAMMOND, JR.
EMORY LEON CHAFFEE
BY [signature]
ATTORNEY

INVENTORS
JOHN HAYS HAMMOND JR.
EMORY LEON CHAFFEE
BY [signature]
ATTORNEY

INVENTORS
JOHN HAYS HAMMOND, JR.
EMORY LEON CHAFFEE
BY
ATTORNEY

TELEVISION RECONNAISSANCE SYSTEM

Filed Sept. 23, 1955

6 Sheets-Sheet 6

INVENTORS
JOHN HAYS HAMMOND, JR.
EMORY LEON CHAFFEE
BY
ATTORNEY

United States Patent Office 2,931,857

Patented Apr. 5, 1960

2,931,857

TELEVISION RECONNAISSANCE SYSTEM

John Hays Hammond, Jr., and Emory Leon Chaffee, Gloucester, Mass.; said Chaffee assignor to said Hammond, Jr.

Application September 23, 1955, Serial No. 536,116

6 Claims. (Cl. 178—6.5)

This invention relates to television and more particularly to a television system for transmitting to a ground station views of the terrain as seen from a reconnaissance plane. An object of the invention is to increase the speed, safety and convenience of a reconnaissance or observation system by transferring the recording and observation portion of the system to a ground station while maintaining the "eyes" of the system in the reconnaissance plane.

Another object is to provide visual pictures of the terrain within a few seconds of the time the reconnaissance plane passes over the terrain, which pictures can be projected in panoramic or stereoscopic display for close examination.

A further object is to provide at the ground station a secure photographic record of the terrain covered by the plane.

Another object is to provide means by which views from an unattended radio-controlled plane can be seen and recorded at a distant station.

The invention also consists in certain new and original features of construction and combinations of parts hereinafter set forth and claimed.

The system comprises a transmitting station in the plane and a receiving station on the ground or elsewhere.

In the plane a television-type camera is pointed downward. The lens of the camera focusses an image of the terrain on the sensitive screen of an image orthicon or an equivalent pick-up tube. Since it requires time for an adequate electrical image to be stored on the image-orthicon screen, the moving image of the ground is immobilized during exposure by an oscillating mirror or an equivalent device.

The exposure time is made as short as possible and is always less than the frame time. The remainder of the frame time after exposure is used for scanning and transmission of the image stored on the screen of the image orthicon during exposure. Complete scanning is accomplished in each frame without interlacing.

One frame, comprising a view of an area directly below the plane, is transmitted and thereafter transmission is interrupted until the plane has moved to a position over a new area of the terrain. Thus only every tenth or twentieth frame is transmitted depending upon the altitude and speed of the plane.

A stereoscopic view may be obtained by transmitting two adjacent frames instead of one for each new position of the plane.

At the receiving station the received video signals are reversed in sense so that they give rise to negative images on a projection picture tube. These negative images, photographically recorded on film, become positive images of the terrain.

The film, after exposure to the projection picture tube, is rapidly processed, dried, and is then available for projection. Single views can be projected or a series of views can be projected by a number of projectors so as to present a panoramic display. For stereoscopic views the pairs of adjacent frames are suitably polarized at right angles to each other and superimposed.

Since the views follow at a rate of about two a second, provision is made for storing the film so that viewing can be accomplished at any rate the observer desires or the sequence can be turned backward in order to permit reexamination of a previous single or panoramic view.

The local time is automatically recorded on the edge of each frame to aid in identifying the location of the view.

The nature of the invention as to its objects and advantages, the mode of its operation and the manner of its organization, may be better understood by referring to the following description, taken in connection with the accompanying drawings forming a part thereof, in which Figure 1 shows in elevation the positions of the plane when views are transmitted;

Like reference characters denote like parts in the several figures of the drawing.

In the following description parts will be identified by specific names for convenience, but they are intended to be generic in their application to similar parts.

Figure 1:
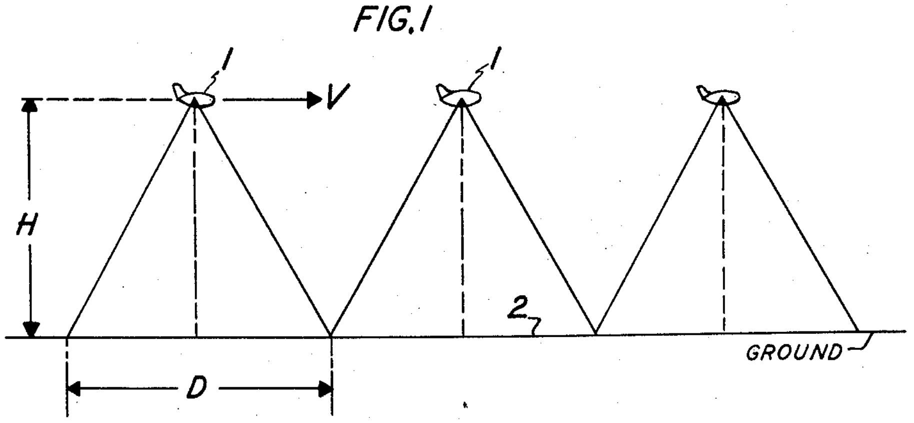

Figure 1 shows a plane 1, which may be jet driven, having a velocity V and travelling at an altitude H above the ground 2. A television-type camera, comprising a lens of focal length $f$ and a pick-up tube such as an image orthicon, is mounted in the plane. If the camera is directed vertically downward, a certain distance D on the ground is focussed on the shorter dimension of the active screen of the pick-up tube. A view of the ground is transmitted to the ground station each time the plane travels a distance D, thus giving a series of adjacent views of the ground. The time T between the separate views is called the picture period, where $T=D/V$.

The focal length of the lens is related to H, D, and $d$, the shortest dimension of the screen of the pick-up tube, by the simple proportion $$f=d\frac{H}{D}$$

Also the picture period T is related to the frame time $T_f$ by the relation $T=nT_f$ where $n$ is an integer. Combining these expressions and the one in the previous paragraph gives $$f=d\frac{H}{D}=\frac{dH}{nT_fV}$$

While various choices as to which factors are to be held constant can be made, a preferred system is obtained by holding $d$ and $T_f$ constant and allowing $f$ to depend upon $$\frac{H}{nV}$$

If $f$ is constant $n$ should vary proportional to $H/V$. On the other hand if D remains constant the resolution is constant. In this case $f$ should vary proportional to H, and $n$ should vary inversely as V. A third alternative is that $f$ vary with $$\frac{H}{V}$$

while $n$ and hence T remain constant. The latter is assumed in the description of the system but the invention is not limited to this particular arrangement.

Figure 2:
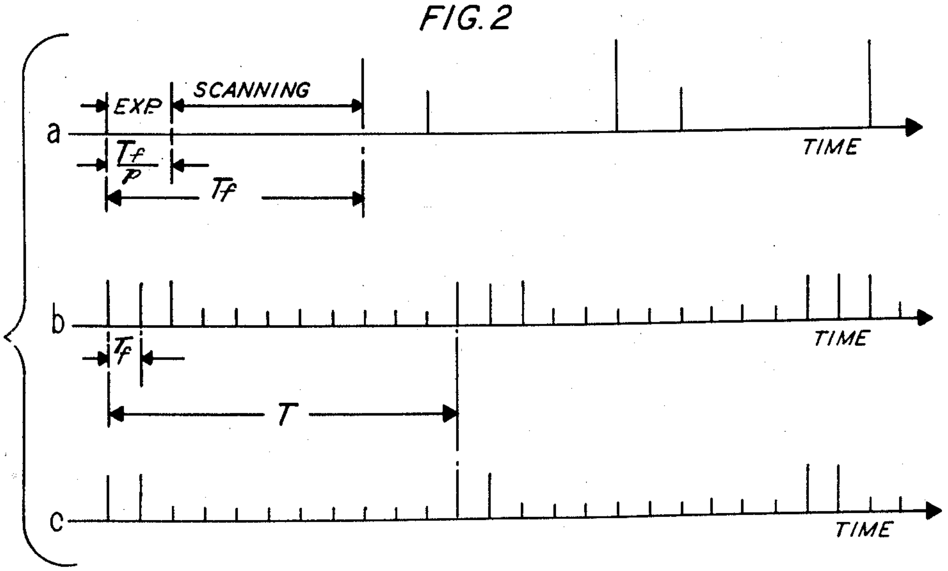
Figure 2 is a time diagram of the essential events in the operation of the system.

The frame time $T_f$ is constant and is such that $nT_f=T$, where $n$ is an integer and assumed fixed in value. A single frame may be transmitted during each interval of T as shown in Figure 2*c*, or two successive frames may be sent as shown in Figure 2*b*. In the latter case the two views are used for stereoscopic display as explained later.

In Figure 2*a* the time scale is stretched by the factor $n$ to show events occurring within the frame time $T_f$. The distance passed over in $T_f$ is $D/n$ and may be of the order of 20 feet. If the exposure of the pick-up tube extended during the whole period $T_f$ as in standard television the image would move so much as to be blurred and unintelligible. For example if $n$ is 10 and N, the number of scanned lines per frame is assumed to be 700, then the image would move during exposure by $N/n$ lines or 70 lines.

Two devices are used to eliminate this blurring. First, the pick-up tube is exposured during $1/p$th of the frame time $T_f$ second, while the stored image is scanned and transmitted during the remaining part of $T_f$, as shown in Figure 2*a* where $p$ is assumed to be 4. It is necessary that $T_f/p$ be long enough to store an adequate electrical image on the screen of the pick-up tube. The second device to immobilize the image is an optical device in the camera to be described later.

Since the scanning time may be three or four times as long as in standard television this factor may be used to advantage by increasing the lines per inch and by using a lower velocity of horizontal scanning. These changes would result in a greater resolution and a decreased video band width as compared with standard television.

Figure 3:
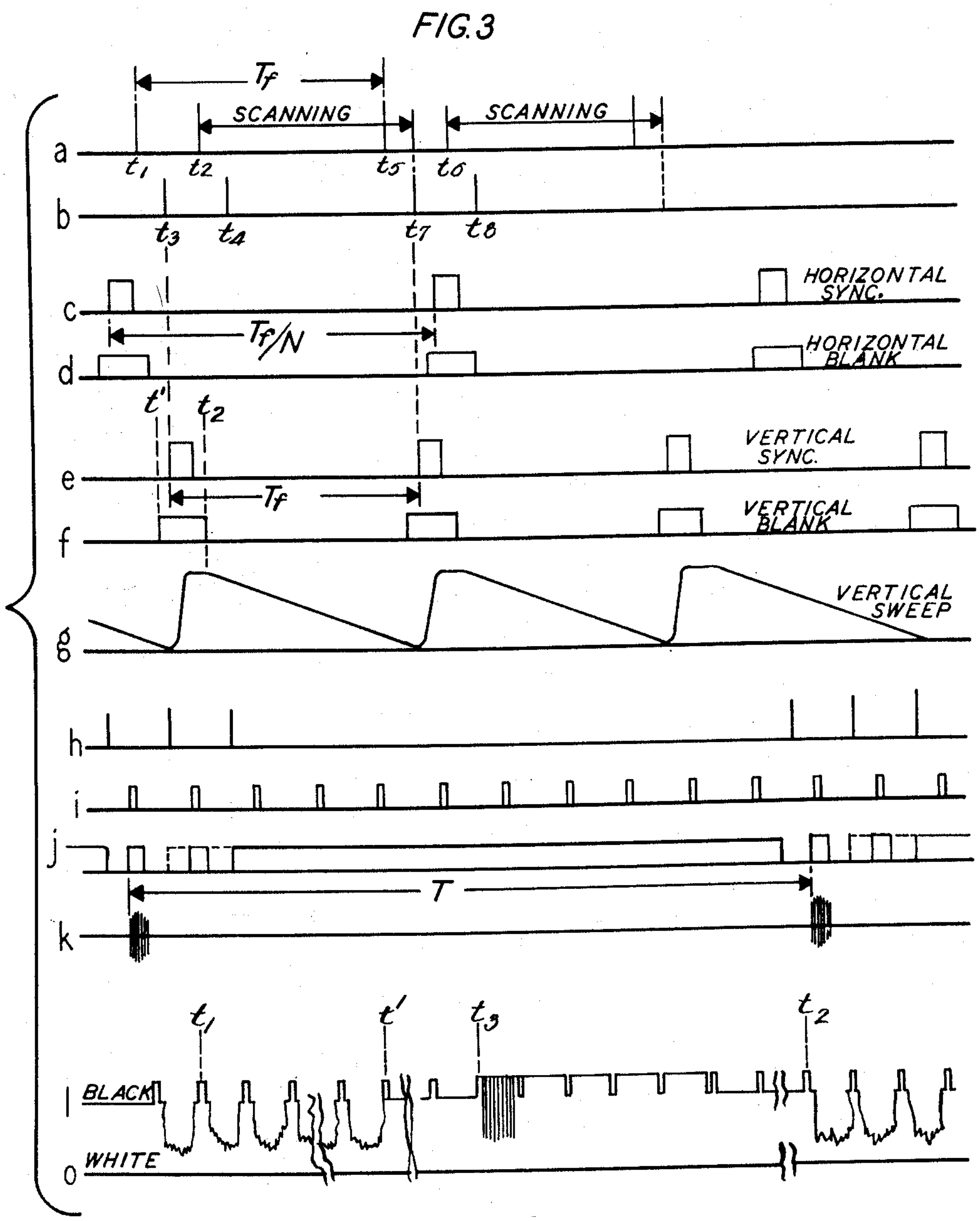
Figure 3 is a time diagram of some of the electrical waves involved in the operation of the system.

Figure 3 shows the important electrical wave forms and associated events at the transmitter which are involved in the operation of the system. Trace *a* in Figure 3 is like Figure 2*b* and shows the times $t_1$ and $t_5$ for the beginning of the two exposure intervals, and the times $t_2$ and $t_6$ for the beginning of the scanning intervals for two frames used for stereoscopic viewing at the receiver. Trace *b* of Figure 3 shows the times $t_3$ and $t_7$ for the beginning of the exposure, and times $t_4$ and $t_8$ for the end of exposure for a lower corner of the screen of the pick-up tube in the transmitter. As indicated by these diagrams, scanning begins for the first frame at $t_2$ and may continue to $t_7$, the latest time any portion of the screen is uncovered by the shutter for the next exposure.

Trace *c* in Figure 3 represens the synchronizing pulses of horizontal sweep frequency, and trace *d* shows the horizontal blanking pulses as they are related to the pulses of trace *c*. The time scale for traces *c* and *d* are expanded as there are N of the pulses shown in these lines within the scanning time front $t_2$ to $t_7$ of traces *a* and *b*. The pulses in traces *c* and *d* are produced and combined by well known means and hence not described here.

Traces *e* and *f* of Figure 3 show the vertical synchronizing and blanking pulses on the time scale of traces *a* and *b*. The frequencies of the horizontal and vertical synchronizing pulses are related by an integral number N, assumed to be 700.

Trace *g* shows the vertical sweep pulses comprising the linear parts which cause the scanning spot to move steadily from top to bottom of the pick-up tube screen, and the fly-back time. The fly-back is initiated by the leading edge of pulses in trace *e* and the linear part of the sweep pulse is initiated by the termination of the blanking pulses in trace *f*.

The events shown in traces *h* through *k* are plotted on a much compressed time scale. Trace *h* shows the timing of the pairs of frames transmitted every T seconds as in trace *b* of Figure 2. Trace *i* shows the vertical synchronizing pulses of trace *e* and their proper time relation to the events in trace *h*. Trace *j* shows an additional blanking wave which acts in conjunction with the wave of trace *f*. The wave of trace *j* blanks the camera for the $n-2$ frame times within period T when no pictures are transmitted. The two blanking pulses of trace *f*, which occur within the unblanked times of trace *j* are also shown. A gate circuit described later is actuated by these two pulses to give the pulses in trace *k*. These are marker pulses of high audio frequency which serve to synchronize the receiver with the transmitter.

Trace *l* shows the composite envelope of the transmitted wave on a much expanded time scale so as to show the separate horizontal synchronizing pulses, the porches, the video signal, the vertical synchronizing pulse, and the marker wave. The various times within the frame time are indicated by the letters $t_1$ through $t_3$ which correspond to the same letters in traces *a* and *b*.

Figures 4, 5, 6:
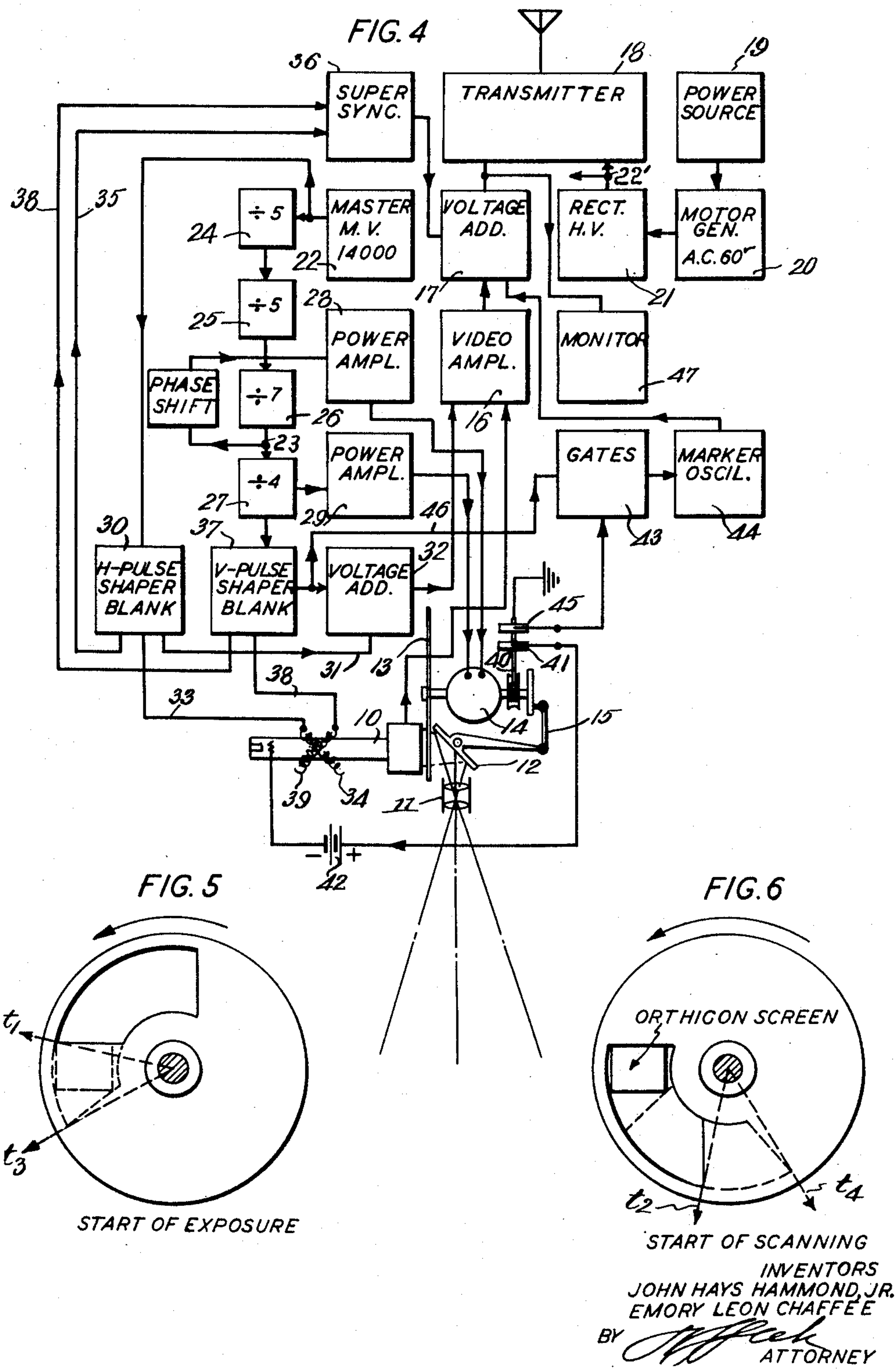
Figure 4 shows diagrammatically the essential parts of the system carried by the plane.
Figure 5 shows the rotating shutter disk in the plane in the position for the beginning of exposure.
Figure 6 shows the shutter disk in the position for the beginning of scanning.

The essential elements of equipment located in the reconnaissance plane are shown in Figure 4. The optical image of the ground is formed on the screen of the pick-up tube 10 by lens 11 and mirror 12. A rotating shutter disk 13, which is driven by synchronous motor 14 at a speed of one revolution in $T_f$ seconds, allows the light to pass during $1/p$th of a revolution for exposure of the pick-up tube. The shutter disk for a $p$ of 4 is shown in Figures 5 and 6 in which the times $t_1$ through $t_4$ are identified with angular positions of the shutter.

One form of optical device for immobilizing the image on the screen of tube 10 comprises the moving mirror 12. This mirror is caused to oscillate by a mechanical mechanism 15 driven by synchronous motor 14. The design is such as to give to the mirror a constant angular velocity during the time the light passes through shutter disk 13. This angular velocity remains fixed for various altitudes if the focal length $f$ is varied proportional to altitude H as assumed.

The video signals from tube 10 are fed through video amplifier 16 and then through voltage adder 17 to transmitter 18 where they are used to modulate a carrier wave.

The power source in block 19, if a low-voltage direct-current source as is common in planes, feeds a motor-generator converter 20 to give alternating current of say 60-cycle frequency. A high-voltage power supply 21 is provided either by rectifiers driven from the A.C. source 20 or directly from a D.C. generator in the motor-generator block 20. This high-voltage power from source 21 feeds the transmitter 18 through line 22' and all other elements requiring high voltage through lines most of which are not shown. The filament heating power of all vacuum tubes is supplied either directly from source 19 or from the A.C. power from converter 20. The lines supplying this heating power are not shown.

A master oscillator in block 22, which may be in the form of a conventional free-running multivibrator, supplies a periodic voltage of a frequency of $f_H$ which for example is assumed to be 14 kc. This voltage is stepped down in frequency by conventional counters in blocks 24, 25, 26, and 27. A voltage of frequency 14 kc. divided by $5\times5\times7$ or 80 cycles per second taken off at point 23, is amplified in power amplifier 28, and drives an eight-pole section of motor 14 at twenty revolutions per second. In order to ensure that the shutter will be in the correct phase, there being four possible positions of the shutter in a revolution of the motor driven on 80 cycles, a voltage of twenty cycles per second, taken from divider 27, is power amplified in box 29 and feeds a two-pole section of motor 14.

The voltage of horizontal sweep frequency $f_H$ taken from block 22 is fed to block 30 which contains the well known circuits to form the horizontal driving and blanking pulses shown in traces *c* and *d* of Figure 3 and also the horizontal sweep wave. The horizontal blanking pulses are fed by line 31 to the voltage-adding circuit in block 32 and then to the video amplifier in block 16. The horizontal sweep wave is fed by line 33 to the deflection coils 34 of pick-up tube 10. The combined drive and blanking pulses are fed by line 35 to block 36 where the supersync signals are compounded and then fed to the transmitter 18 through adding circuits in block 17.

Similarly, the voltage from block 27 of frequency $f_V$ is fed to block 37 where, in a well known manner, the vertical drive and blanking pulses, shown in traces *e* and *f* of Figure 3 are formed. These are fed over line 38 to block 36 where they contribute to the supersync wave. The vertical-blanking pulses are fed to voltage adder in block 32 to combine with the horizontal blanking pulses. The vertical sweep pulses, formed in the conventional manner in block 37 are fed over line 38 to the vertical deflection coils 39 of tube 10.

A shaft 40 is worm driven from the shaft of motor 14 so as to make one revolution every *n* revolutions of the motor shaft. A brush 41 rests on a commutator which closes a circuit during the $n-2$ frame times during which no frames are transmitted. This circuit contains battery 42 which blanks out the electron beam of pick-up tube 10 during the long intervals as shown in trace *j* of Figure 3.

Block 47 in Figure 4 is a monitor which displays the same views as are produced in the receiver in order that the operator may make adjustments of focus and timing to assure clear pictures at the receiver. Monitor 47 is actuated by the composite video signal which is used to modulate transmitter 18.

Figure 7:
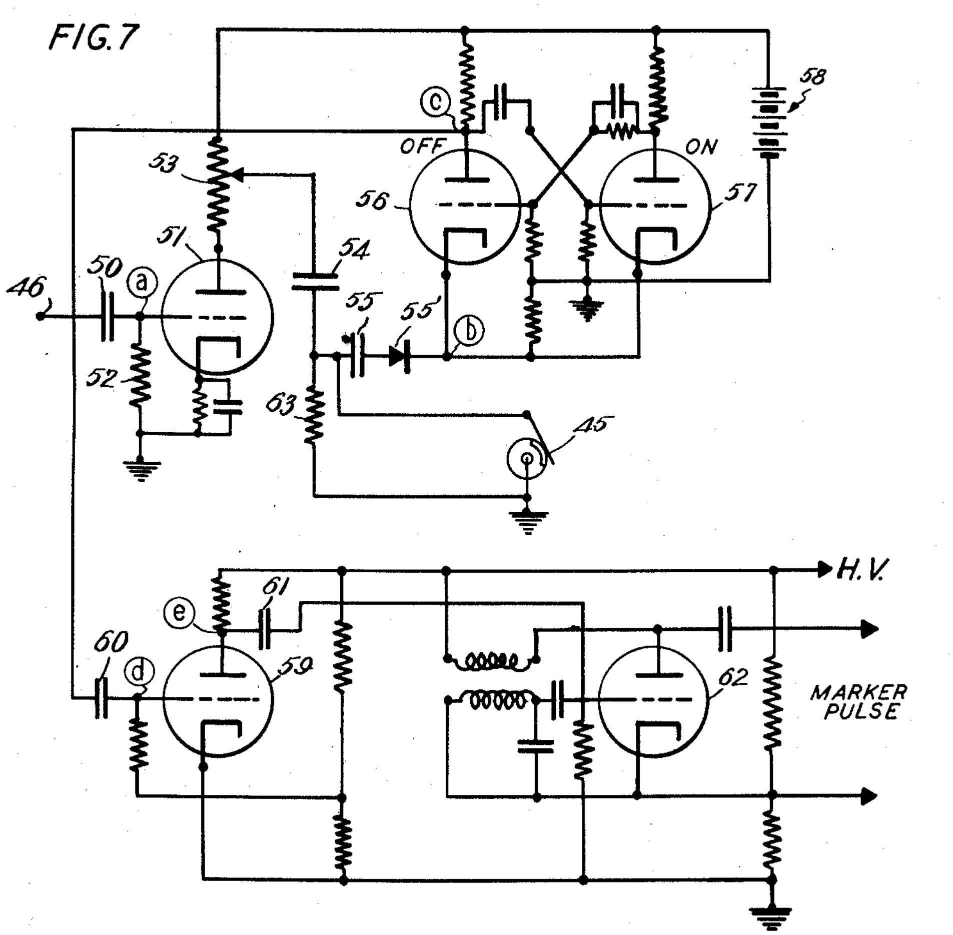
Figure 7 shows diagrammatically control circuits in the plane for producing the marker wave.
Figure 8:
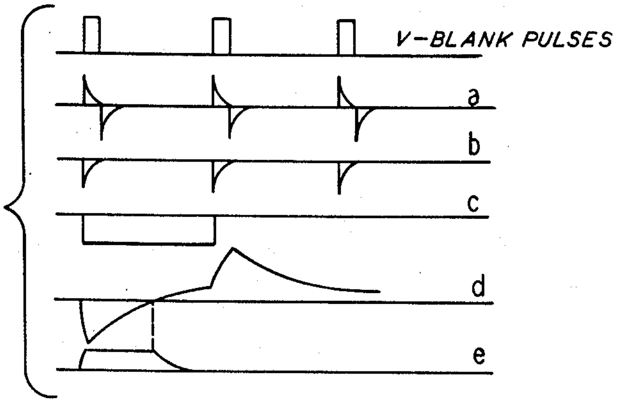
Figure 8 shows some of the electrical wave forms pertaining to Figure 7.

The gates in block 43 and the marker oscillator in block 44 supply to block 17 the marker pulses shown in trace *k* of Figure 3. The operation of these circuits is best explained by referring to Figure 7. The vertical blanking pulses in trace *f* of Figure 3 are fed over line 46 through coupling capacitor 50 to the grid of amplifier 51 in Figure 7. Grid resistor 52 and capacitor 50 are proportioned to give a differentiated voltage on the grid of tube 51 as shown in trace *a*, Figure 8. The negative-going spike, tapped off the plate resistor 53 is fed through coupling capacitors 54 and 55 and unidirectional conductor 55' to the cathodes of the cathode-coupled counter circuit comprising tubes 56 and 57. Normally tube 57 is conducting and tube 56 is non-conducting. Hence point (*c*) is at the positive voltage of the power source 58 at $t_1$ in Figure 3 just before the vertical blanking pulse of the first exposure interval. At the beginning of the pulse in trace *e* of Figure 3 which coincides with $t_3$, tube 56 starts conducting and the voltage of point (*c*) drops and remains low until the next vertical driving pulse at $t_7$ occurs. At this time tube 56 becomes non-conducting and point (*c*) rises in potential.

Point (*c*) is connected to the grid of amplifier 59 through capacitor 60. The voltage of the grid is shown in trace *d* of Figure 8. The tube 59 remains cut off for an appreciable time as shown in trace *d* of Figure 8. The plate of tube 59 is coupled through capacitor 61 to the grid of blocking-oscillator tube 62. The circuits of oscillator 62 are proportioned to permit say fifteen or twenty oscillations to occur before the grid voltage of tube 62 becomes so negative as to stop oscillation. The oscillations are started by the positive pulse from point (*e*) shown in trace *e* of Figure 8.

To provide only one marker pulse every *n* frame times, tube 51 is decoupled from the counter circuits by commutator contactor 45 which short circuits resistor 63 except during the first exposure period in each *n* frames. Commutator 45 is mounted on the shaft 40 and driven by motor 14.

Figure 9:
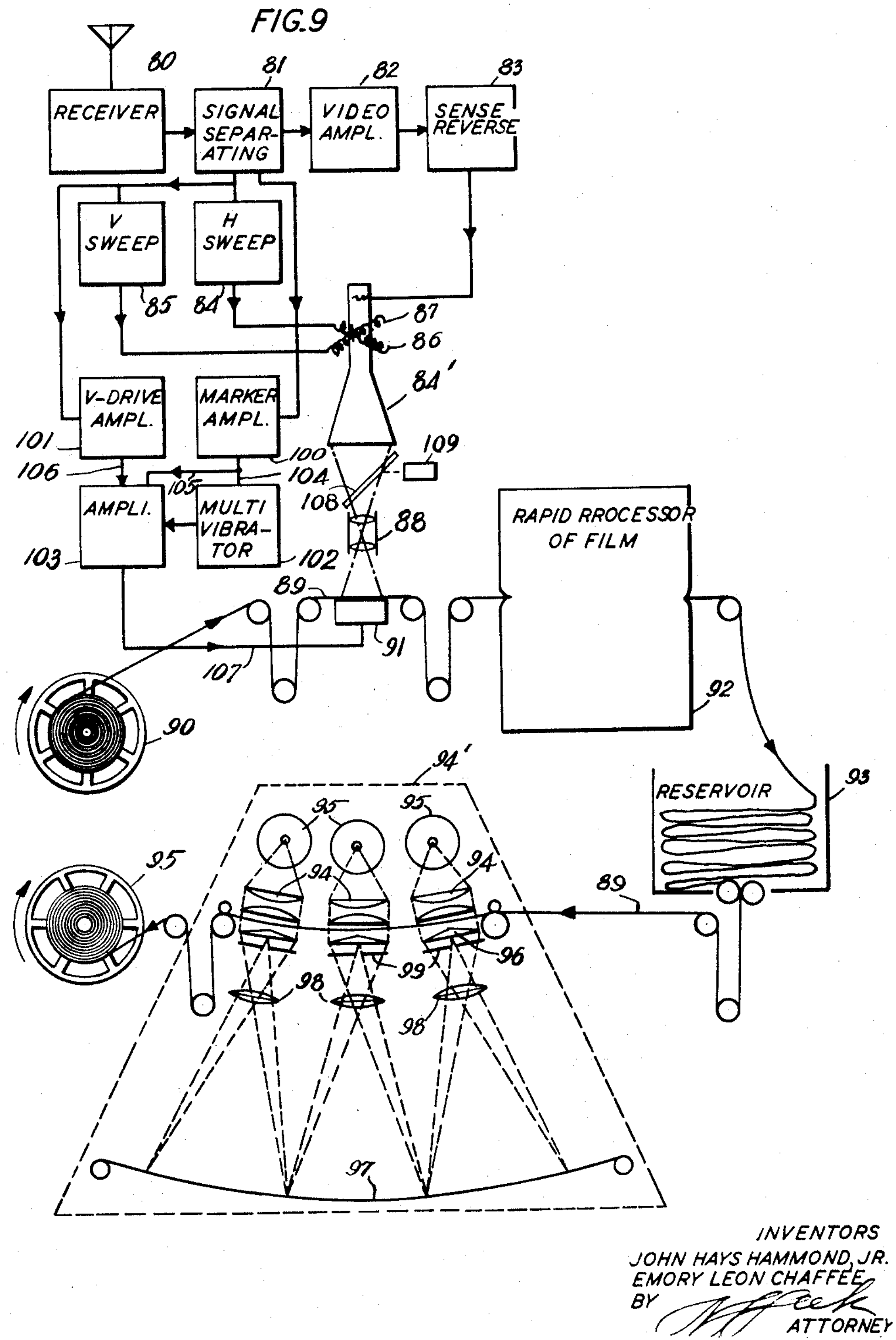
Figure 9 shows diagrammatically the essential parts of the system at the ground station.

Figure 9 shows the elements of the receiver. The composite signal shown in trace *l* of Figure 3 is received by the conventional receiving circuits in block 80. The circuits in block 81 separate the components of the signal into the video part, the marker pulses, and the synchronizing signals. The video signals pass through amplifier 82, and inverter 83 which reverses the signals so that the images on the screen of the projection picture tube 84' are negatives of the original views. The horizontal synchronizing signals synchronize the horizontal oscillator which in turn controls the production of the horizontal sweep voltages in block 84, and similarly the vertical synchronizing pulses control the production of the vertical sweep voltages in block 85. These sweep waves are led respectively to the horizontal and vertical deflection coils 86 and 87.

The negative image on the screen of tube 84' is focussed by lens 88 on the film 89. Film 89 is fed at uniform rate from reel 90 but is caused, by the electrically actuated mechanism in block 91, to advance intermittently by one frame at a time.

For identification of each frame an illuminated clock 109, giving time numerically is photographed on the margin of each frame by reflection in the glass plate 108.

After exposure the film travels at a uniform rate through the rapid-processing system in block 92. This system is not described here since it is obtainable on the market and is similar to the system developed by the Eastman Kodak Company for use in Telefax. The time for complete processing and drying of the film for any one exposure is about forty seconds.

The processed film, having positive pictures of the originals, is stored in reservoir 93. The film can be drawn out of reservoir 93 at any rate and projected in projection system 94' and finally stored on reel 95.

The film may be projected singly or several at a time to present a panoramic view. The views may also be projected stereoscopically or non-stereoscopically. Since the simple non-stereoscopic projection is simpler than stereoscopic projection, the method of stereoscopic projection will be described as applied to a panoramic presentation of three views. The simpler methods of projection are obvious simplifications of the one described and will not be explained in detail.

The views are taken in pairs which, being taken at slightly different positions, will when viewed give a stereoscopic effect. A blank field is located between each pair. Film 89 in Figure 9 is passed in front of three condensing lenses 94 and lights 95 so that a pair of views is illuminated by one light. Bi-prisms 96 are placed in front of each pair of views and have angles such as to superimpose on screen 97 the two views as projected by lenses 98. In front of each bi-prism are placed two sheets of polarizing material 99 oriented so that the light for the two superimposed views are polarized at right angles to each other. Hence when the projected images on screen 97 are viewed through properly oriented polarizing viewers, the stereoscopic effect is obtained.

The intermittent motion of the film through the exposure station is effected by the electrically controlled mechanical mechanism in block 91. The electrical impulses which actuate the mechanism in block 91 are produced by the marker pulse shown in trace *k* of Figure 3 and then by the next two vertical drive pulses. The marker pulse advances the film one frame for the first exposure, the next vertical drive pulse advances the film one frame for the second exposure, and the second vertical drive pulse advances the film one frame in order to place the last exposed frame in a dark protected position and also to provide the necessary blank frame between the pairs of exposed frames.

Figures 10, 11:
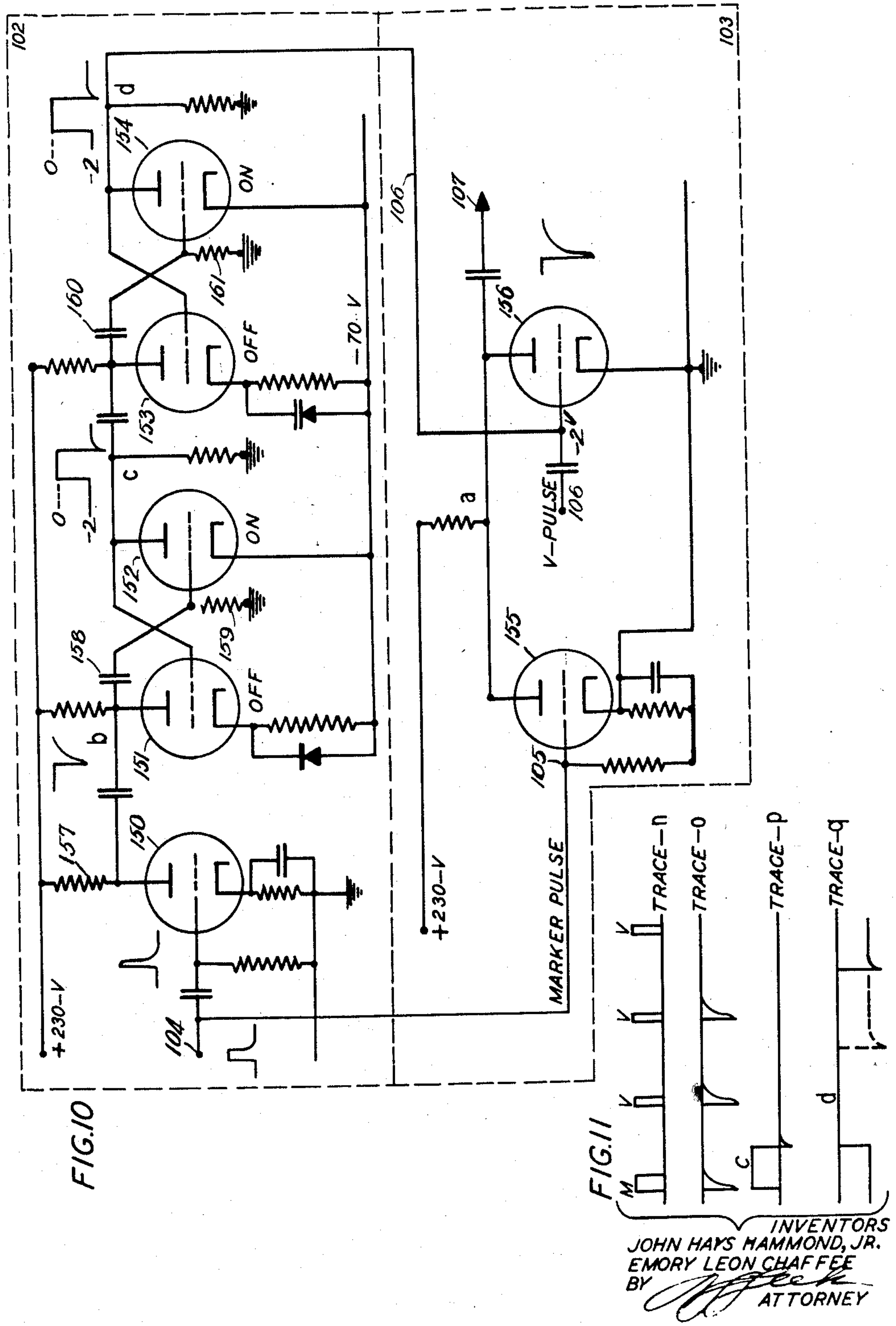
Figure 10 shows diagrammatically special circuits at the receiver for controlling the advance of the film.
Figure 11 shows some electrical wave forms pertaining to Figure 10.

The electrical circuits for producing the impulses for activating the mechanism in block 91 are contained in blocks 102, and 103, and are shown in detail in Figure 10. Block 100 contains a detector and an amplifier for providing over lines 104 and 105 a positive going pulse derived from the marker pulse supplied by block 81. Block 101 contains an amplifier for providing over line 106 positive-going pulses in time with the vertical drive pulses from block 81.

In Figure 10, tubes 150, 151, 152, 153 and 154 are contained in block 102 and comprise a trigger stage 150 and two monostable multivibrators 151, 152, and 153, 154. Tubes 155 and 156 are contained in block 103 and comprise a single-stage amplifier with two inputs.

The marker pulse over line 105, shown in trace *n* of Figure 11, causes a rise in voltage of the grid of tube 155 and a consequent drop in voltage of point (*a*), giving rise to the first pulse in trace *o* of Figure 11. This pulse passes over line 107 to block 91. The marker pulse also causes the plate current of tube 150 to increase, which causes a negative going pulse to act upon the grid of tube 152. Tube 152, normally conducting, is caused to shift to the nonconducting state while tube 151 becomes conducting. This condition persists for a time depending upon the values of resistance 159 and capacitance 158. The state of conduction of tubes 151 and 152 revert to the normal condition as soon as the grid voltage of tube 152 rises to positive value. The resulting voltage of point (*c*) is shown in trace *p* of Figure 11.

In the second multivibrator, comprising tubes 153 and 154, the former is normally nonconducting and the latter conducting. Hence the voltage of point (*d*) is negative and amplifier tube 156 is unresponsive to vertical pulses by way of line 106 acting upon its grid. However, when the first multivibrator reverts to its normal state, which is made to occur about midway between the marker pulse and the next vertical pulse (see tract *n*) the negative pulse acting upon the grid of tube 154 causes it to become nonconducting. As a consequence point (*d*), and hence the grid of tube 156, rises in potential and tube 156 becomes responsive to any vertical pulse which acts upon its grid. The time during which tube 154 remains nonconducting depends upon the magnitudes of resistance 161 and capacitance 160 and is made to last long enough to allow two vertical pulses to cause pulses over line 107 as shown in trace *o* of Figure 11. After tube 154 again becomes conducting no subsequent vertical pulse will cause pulses in line 107 until the next marker pulse initiates a new cycle.

The system described is adapted to send pairs of adjacent views for stereoscopic projection. The system may be adapted to send only single frames by making the following changes. Commutator 41 is replaced by another which blanks the second vertical pulse in trace *j* of Figure 3 as shown in dotted lines, and commutator 45 is replaced by another which decreases the length of gate *d* as shown by the dotted line in trace *q* of Figure 11. Each of the projectors of Figure 9 would be smaller in size so as to include one instead of two frames and the prisms 96 and polarizers 99 would be omitted.

Although only a few of the various forms in which this invention may be embodied have been shown herein, it is to be understood that the invention is not limited to any specific construction but may be embodied in various forms without departing from the spirit of the invention.

What is claimed is:

1. A ground survey system comprising a television-type transmitter including a camera tube to be carried along a horizontal path at a uniform speed and height above the ground area to be surveyed, means producing on said tube optical images of selected ground areas, timed means exposing said tube to said images for fixed exposure periods at predetermined time intervals, means immobilizing the images on said tube during the exposure periods, means scanning said tube both horizontally and vertically in intervals between said exposure periods to produce video signals, means transmitting said signals to a receiving station, and means at said receiving station including a picture tube to receive said video signals and produce therefrom a succession of images on said picture tube.

2. In a system as set forth in claim 1, means blanking said signals for a predetermined number of scannings after each transmitted scanning, said number of blanked scannings being selected to cause successive transmitted images to represent adjacent ground areas.

3. A ground survey system comprising a television-type transmitter including a camera tube to be carried along a horizontal path at a uniform speed and height above the ground area to be surveyed, means producing on said tube optical images of selected ground areas, timed means exposing said tube to said images for fixed exposure periods at predetermined time intervals, means immobilizing the images on said tube during the exposure periods, means scanning said tube both horizontally and vertically in intervals between said exposure periods to produce video signals, means transmitting said signals to a receiving station, means at said receiving station including a picture tube to receive said video signals and produce therefrom a succession of images on said picture tube, means photographing said images on a film, means processing said film to form permanent pictures of said images, and means advancing said film to a projector station having means for projecting said pictures.

4. A system as set forth in claim 3 in which said images are produced in a succession of pairs, the images of each pair representing substantially the same ground area as viewed from two different positions, said receiving station projecting the images of each pair simultaneously in superimposed positions and means differently polarizing the two images to produce a stereoscopic effect.

5. A television-type transmitter including a camera tube to be carried along a horizontal path at a uniform speed and height above the ground area to be surveyed, means producing on said tube optical images of selected ground areas, timed means exposing said tube to said images for fixed exposure periods at predetermined time intervals, means immobilizing the images on said tube during said exposure periods, means scanning said tube both horizontally and vertically in intervals between said exposure periods to produce video signals, means blanking said signals between selected scannings, and means transmitting said signals to a receiving station.

6. In a transmitter as set forth in claim 5, a rotatable disc shutter positioned to control the exposure times and scanning times of said tube and an oscillating mirror to immobilize said image during said exposure times, and a single driving means driving said disc and oscillating said mirror in synchronism.

References Cited in the file of this patent

UNITED STATES PATENTS

| | | |
|---|---|---|
| 2,239,489 | Hogan et al. | Apr. 22, 1941 |
| 2,275,898 | Goldsmith | Mar. 10, 1942 |
| 2,373,114 | Goldsmith | Apr. 10, 1945 |
| 2,381,902 | Goldsmith | Aug. 14, 1945 |
| 2,402,053 | Kell | June 11, 1946 |
| 2,419,024 | Iams | Apr. 15, 1947 |
| 2,436,516 | Larson et al. | Feb. 24, 1948 |
| 2,525,891 | Gorman et al. | Oct. 17, 1950 |
| 2,622,147 | Condliffe et al. | Dec. 16, 1952 |
| 2,709,716 | Haller | May 31, 1955 |
| 2,798,115 | Wiens | July 2, 1957 |
| 2,798,116 | Wiens | July 2, 1957 |